(12) United States Patent
Overholt et al.

(10) Patent No.: US 7,252,041 B2
(45) Date of Patent: *Aug. 7, 2007

(54) FLAME RETARDANT POLYOLEFIN PALLETS AND FLAME RETARDANT MASTER BATCH FOR THEIR PRODUCTION

(75) Inventors: Trenton M. Overholt, Manhattan Beach, CA (US); Justin M. Smyers, Redondo Beach, CA (US)

(73) Assignee: Rehrig Pacific Company, Los Angeles, CA (US)

( * ) Notice: Subject to any disclaimer, the term of this patent is extended or adjusted under 35 U.S.C. 154(b) by 82 days.

This patent is subject to a terminal disclaimer.

(21) Appl. No.: 11/214,390

(22) Filed: Aug. 29, 2005

(65) Prior Publication Data

US 2006/0004134 A1   Jan. 5, 2006

Related U.S. Application Data

(63) Continuation of application No. 10/375,547, filed on Feb. 27, 2003, now Pat. No. 6,998,433.

(51) Int. Cl.
*B65D 19/32* (2006.01)
(52) U.S. Cl. .................... 108/57.28; 108/57.25; 108/57.26; 108/57.27; 524/436; 523/351

(58) Field of Classification Search .. 108/57.25–57.28; 524/433, 436; 523/351
See application file for complete search history.

(56) References Cited

U.S. PATENT DOCUMENTS

| 3,572,535 A | 3/1971 | Kinzie |
| 4,727,102 A | 2/1988 | Scarso |
| 5,687,652 A | 11/1997 | Ruma |

(Continued)

FOREIGN PATENT DOCUMENTS

WO    WO 03/035495    5/2003

(Continued)

OTHER PUBLICATIONS

"Intumescents: Coating Contains Dual Components," Flame Retardancy News, vol. 11; Issue 7, Jul. 1, 2001.

(Continued)

*Primary Examiner*—Peter Szekely
(74) *Attorney, Agent, or Firm*—Brooks Kushman P.C.

(57) ABSTRACT

Polyolefin-based pallets capable of passing standard pallet flammability tests are prepared by molding the pallet or one or more subassemblies thereof, of a polyolefin molding resin containing a flame retardant package containing magnesium hydroxide, and optionally alumina trihydrate, and zinc borate. The flame retardants may be supplied as a master batch at a concentration higher than that desired in the pallet or subassembly, in a polyolefin-compatible polymer, and result in pallets having a significantly lower heat release rate.

15 Claims, 2 Drawing Sheets

U.S. PATENT DOCUMENTS

| | | |
|---|---|---|
| 5,879,495 A | 3/1999 | Evans |
| 6,199,488 B1 | 3/2001 | Favaron et al. |
| 6,228,914 B1 | 5/2001 | Ford et al. |
| 6,344,508 B1 | 2/2002 | Endo et al. |
| 6,395,342 B1 * | 5/2002 | Kadowaki et al. ....... 427/434.2 |
| 6,448,307 B1 * | 9/2002 | Medoff et al. .............. 523/129 |
| 6,705,237 B2 * | 3/2004 | Moore et al. ............ 108/57.25 |
| 6,998,433 B2 * | 2/2006 | Overholt et al. ............ 524/404 |
| 2001/0029874 A1 | 10/2001 | Muirhead |
| 2001/0031807 A1 | 10/2001 | Adedeji et al. |
| 2002/0175435 A1 | 11/2002 | Weiland et al. |
| 2003/0032702 A1 * | 2/2003 | Medoff et al. ................ 524/13 |
| 2003/0079658 A1 | 5/2003 | Torrey et al. |
| 2003/0079660 A1 | 5/2003 | Torrey et al. |
| 2004/0077787 A1 * | 4/2004 | Karande et al. .............. 525/88 |

FOREIGN PATENT DOCUMENTS

WO    WO 03/035496    5/2003

OTHER PUBLICATIONS

Renstrom, R., "Clean Rooms Getting Cleaner," Plastics News, vol. 13, N. 30, Sep. 24, 2001.

"Prototype Production will Utilize Breakthrough Thermoplastic Flow Forming Technology to Achieve Superior Performance and Economic Results," Las Vegas Business Wire, Jul. 23, 2001.

English Abstract corresponding to JP 11278485 A.

* cited by examiner

FLAME RETARDANT POLYOLEFIN PALLETS AND FLAME RETARDANT MASTER BATCH FOR THEIR PRODUCTION

CROSS-REFERENCE TO RELATED APPLICATIONS

This application is a continuation of U.S. application Ser. No. 10/375,547 filed Feb. 27, 2003 now U.S. Pat. No. 6,998,433.

BACKGROUND OF THE INVENTION

1. Field of the Invention

The present invention pertains to flame retardant shipping pallets of polyolefin plastic.

2. Background Art

In the past, shipping pallets were made largely of wood. More recently, numerous materials have at least partially superseded wood-based pallets. For example, pallets of injection molded polymers are being used increasingly. Such polymer pallets have numerous advantages. For example, polymer pallets are capable of being molded in complex shapes which facilitate the shipping of numerous types of articles. Polymer pallets are also easy to clean, which encourages their reuse.

Wood pallets are inherently combustible, and are rather easily ignited. While polymer articles are in general somewhat more difficult to ignite, once ignited they also constitute combustible products, and pound for pound have more potential energy than wood articles. In the shipping industry, empty pallets are often stacked together for reuse or for return to the shipper ("idle storage"). When wood pallets are so stacked and ignited, the fire is generally concentrated in an upward direction. However, when polymer pallets burn, in addition to having greater potential energy (combustibility), the flame can also spread downward by dripping. Thus, the combustion of polymer pallets involves more heat and more potential energy, a combustion mechanism not found in wood pallets. Thus, it is desirable to minimize the combustibility and heat release, and in turn lower the flame spread of polymer based pallets. It is further desirable to provide pallets which mimic the behavior of wood pallets during combustion, and which are preferably improved with respect to combustion properties.

One solution which has been proposed is to produce pallets of polymers which are less flammable than pallets of commodity resins such as polyolefins. However, such speciality polymers, e.g. polyphenylene oxide polymers, are considerably more expensive than the polyolefin polymers conventionally used to manufacture pallets. Such specialty polymers are also, in general, much more difficult to mold than polyolefins. It has also been proposed to add flame retardant compositions which include relatively large amounts of halogenated organic flame retardants. However, such flame retardants can liberate noxious gases when burning, and in addition, are becoming increasingly regulated. It would therefore be desirable to avoid use of halogenated flame retardants.

A standard test for pallet flammability has been established by Underwriters Laboratories, as UL 2335 "Fire Tests of Storage Pallets," referred to, for example, in WO 00/20495. In one version of this test, the "Idle Pallet Test," six stacks of pallets are assembled in a 2×3 array with a 6" longitudinal flue space longitudinally between arrays in a room with a 30 foot high flat ceiling having 165° F. (74° C.) standard response sprinklers having a design density of 0.60 gpm/ft². An instrumented steel beam is placed near the ceiling, and the pallets are ignited by hydrocarbon soaked cellulosic bundle positioned in the flue space. The parameters assessed include flame spread, maximum steel beam temperature, and number of sprinklers activated. As can be seen, this test is a rather stringent one.

In a second version of the test, the so-called "Commodity Storage Test," as illustrated in FIG. 1, a 2×2×2 array 1 of pallets 5, each carrying a Class II commodity carton 2, are placed 25 feet (7.5 m) below a 10 M watt heat release calorimeter 3 and ignited by four igniters in the center flue space, each igniter comprising a 3 inch (12.5 cm) cellulosic bundle soaked with 4 oz. (112 g) heptane in a polyethylene bag. Overhead sprinklers 4 at a height of 10 feet (3 m) are activated electromechanically when the instrumentation indicates that a sprinkler activation temperature of 286° F. (141° C.) has been reached. A series of three tests is made, with water application rates of 0.11, 0.21, and 0.31 gpm/ft². In each test, four parameters are noted: maximum one minute mean total heat release rate; maximum one minute mean convective heat release rate; effective convective heat release rate, defined as the average convective heat release rate measured over five minutes of the most intense fire; and convective energy, the average convective heat release rate measured over the 10 minutes of most severe burning.

Although numerous flame retardants and combinations thereof are known for use in plastic articles generally, the stringent tests required of pallets render flame retardancy results unpredictable. Numerous flame retardants and combinations have been tested, and while many of these have been found suitable for polyolefin articles other than pallets, their use in pallets has not proven acceptable.

WO 00/20495 discloses pallets prepared from specialty resins such as polyphenylene ether resins, polycarbonate resins, vinyl aromatic graft copolymer resins, and polyetherimide resins further including arylphosphate esters and zinc chalcogenides. In U.S. Pat. No. 4,727,102, "self extinguishing" polyolefins are disclosed containing major amounts of ammonium polyphosphate, tris(2-hydroxyethyl)isocyanurate, and melamine cyanurate. However, the large amounts of additives (40%) severely compromise the properties of products prepared from the polyolefin resin.

It would be desirable to provide a polyolefin composition suitable for use in molding pallets which is injection moldable, exhibits good flame retardance in standard tests, and which is commercially cost effective. However, until now, tests of flame retardant systems for use in polyolefin polymer pallets did not result in satisfactory performance.

SUMMARY OF THE INVENTION

It has now been surprisingly discovered that polyolefin-based plastic pallets can be manufactured which satisfactorily pass standard pallet flammability tests, when the polyolefin is compounded with a fire retardant package comprising minimally magnesium hydroxide, and preferably also containing zinc borate and alumina trihydrate as optional flame retardant ingredients. The flame retardant ingredients are preferably supplied as a master batch and incorporated into conventional polyolefin molding resins prior to injection molding.

DETAILED DESCRIPTION OF THE PREFERRED EMBODIMENTS

Figure 1:
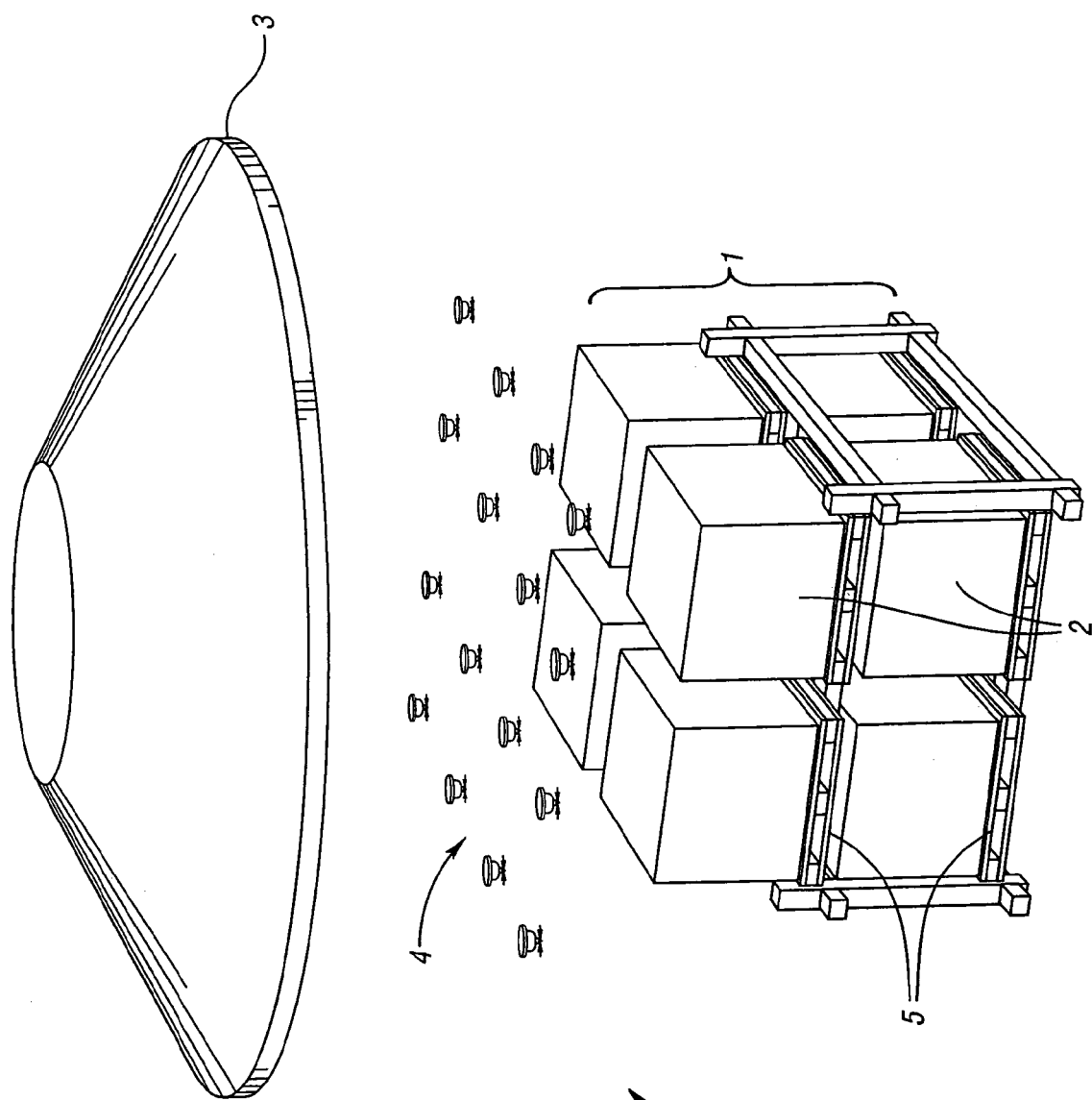
FIG. 1 illustrates a typical Commodity Storage Test setup to assess flammability characteristics of pallets.

The polymer pallets of the present invention may take numerous forms. It has been found convenient to mold pallets in several subassemblies and assemble the pallets together by snap fittings, fusion or adhesive bonding, or by a variety of such assembly techniques. In this manner, non-load bearing areas may be made of thinner section, thus minimizing raw material usage. Moreover, use of a plurality of subassemblies allows pallets of more complex shape to be produced.

The polymer of which the pallets of the subject invention are constructed is polyolefin, although it is not necessary to form all parts of these polymers. Pallet portions which contribute more to ease of flammability or flame spread may be made of other polymers which are less flammable than polyolefin or which tend to melt and/or drip less than polyolefin. A pallet construction which employs portions of different flammabilities which takes advantage of these characteristics is disclosed in commonly assigned U.S. application Ser. No. 10/040,098, filed Oct. 19, 2001, incorporated herein by reference, as is also U.S. application Ser. No. 10/040,099.

The polyolefin polymers may be, for example, but not by way of limitation, polyethylene, polypropylene, or polybutylene. In general, the polyolefin polymers are copolymers, for example copolymers of ethylene with propylene, 1-butene, 1-hexene, 1-octene, or mixtures thereof, or copolymers of propylene with ethylene, 1-butene, 1-hexene, 1-octene or mixtures thereof. Homo and copolymers of propylene are preferred. Different polyolefin polymers may be used for various subassemblies. Polymer blends of polyolefins with other compatible thermoplastics or with elastomeric tougheners such as elastomeric polymers of styrene, butadiene, alkyl acrylates, and the like are also useful. When such tougheners are used, they are generally present in the form of relatively small particles, or as interpenetrating polymer networks, as is well known in the art of toughened thermoplastics.

The polyolefin polymers may also be reinforced or filled. Suitable fillers include typical reinforcing and non-reinforcing fillers such as precipitated and fumed silicas, ground quartz, diatomaceous earth, ground limestone, ground felspar, mica, expanded mica, precipitated calcium carbonate, etc. The term "reinforcing" with respect to fillers generally refers to fillers of small size and high surface area, for example mean particle sizes of about 0.1 µm or less, and specific surface areas (BET) of 50 $m^2/g$ or higher while non-reinforcing fillers, which are preferred, have larger particles sizes, e.g. 1 to 100 µm, preferably 1 to 20 µm. Suitable fibrous fillers are typically short or long glass fibers. Other fibrous reinforcement such as aramid fiber, carbon fiber, boron nitride fiber, etc., may also be used, however such materials are generally more expensive than glass fibers. Some subassemblies may be filled or may contain fibrous reinforcement whereas other subassemblies may not, or may contain differing reinforcement and/or fillers. Use of continuous fiber reinforcement is also possible in some cases, particularly when polyolefin-based GMT intermediate products are used for molding, or when resin transfer molding and similar techniques are used.

The pallet or at least one of its component subassemblies must contain a flame retardant "FR" package in accordance with the subject invention. The subject invention FR package includes, in percent by weight relative to the total weight of polyolefin and FR package, from 8 to 35% magnesium hydroxide, preferably 10 to 30%, and more preferably 12 to 25%; optionally from 0.1-10%, more preferably 0.5 to 8% and most preferably 2-5% alumina trihydrate; and optionally 0.1-10%, more preferably 0.5 to 8% and most preferably about 2-5% zinc borate, these percentages being weight percents based on the weight of polymer and flame retardants. In particular, an FR package containing 12-25% magnesium hydroxide, 2-5% alumina trihydrate, and 2-5% zinc borate is used.

The principle flame retardant in the polyolefin pallets of the present invention is magnesium hydroxide, which is widely available from synthetic sources such as precipitation from brines. It is also available from natural sources, such as crushed minerals, for example, brucite. Precipitated magnesium hydroxide is widely available, for example from the Dow Chemical Co., from Huber, and from other sources. Particle size may vary, but mean particle size is preferably from 1 to about 200 µm, more preferably 1-20 µm, and most preferably in the range of 1-5 µm. It is also possible to introduce all or a portion of the magnesium hydroxide, preferably less than 30% of the total amount employed, in the form of very fine particles having a median size in the range of 20-500 nm, in particular, 50-100 nm. These very small particles may exhibit a reinforcing effect. However, the amount must be such that the polymer remains moldable, as these particle sizes normally elevate the melt viscosity of the polymer composition. Larger size particles can also be employed, subject to the moldability of the polymer composition by the technique desired, e.g. injection molding, which is preferred. However, use of magnesium hydroxide wherein substantially all (i.e. >90%) of the particles are greater than 200 µm may result in an inhomogenously distributed FR package which will not function efficiently. The suitability of any particular size or size distribution can be assessed by flammability testing.

Alumina trihydrate ("ATH") is preferably employed in conjunction with magnesium hydroxide. Alumina trihydrate, or "hydrated aluminum oxide" is widely available from numerous sources, and may be used in the same particle size ranges as for magnesium hydroxide.

Zinc borate is a further optional and preferred flame retardant additive. Zinc borate is also widely available, generally as a white amorphous powder, which may contain water of hydration as well. The particle size ranges are the same as that of magnesium hydroxide. It should be noted that none of the particle sizes of the FR ingredients are particularly critical, and larger and smaller particles may be used as well, consistent with the ability to manufacture the pallets.

Additional flame retardant ingredients are also possible. These include both organic and inorganic retardants. Organic flame retardants include numerous conventional nitrogenous organic compounds such as but not limited to ureas, derivatized ureas, urea and/or melamine/formaldehyde condensates, cyanurates and isocyanurates, melamine derivatives, carbamates, etc. Inorganic flame retardants include antimony trioxide, various metal carbonates, metal bicarbonates, an metal oxides, metal phosphates and hydrogen phosphates, etc. The term "metal" employed above also includes ammonium compounds, since the ammonium ion acts in many cases similar to alkali metal ions. Hydrated inorganic compounds which serve as water generators are also useful.

Halogenated flame retardants are preferably avoided, although most minor amounts may be added without detracting from the spirit of the invention. "Substantially halogenated flame retardant free" refers to the absence of halogenated flame retardant, or the use of halogenated flame retardant which is either 5% by weight or less of the total weight of all flame retardants, or an amount which shows no statistically significant improvement in flammability characteristics. "Halogenated flame retardant free" means the absence of any halogenated organic flame retardant.

Intumescents such as sugars and starches may also be useful, as well as expansible fillers such as expandable mica or graphite. Expanded products such as expanded mica and expanded graphite may also be useful in minor amounts, i.e. amounts which can be incorporated without overly lowering the density and affecting the physical characteristics of the polymer. Glass or ceramic microballoons may also be useful.

The flame retardant ingredients, when solid, are supplied in pulverulent form, and may be incorporated into the polyolefin by conventional techniques, i.e. in mixers or blenders, but preferably in an extruder, i.e. a single screw, or preferably a twin screw extruder. It has been found that preparation of a master batch of the same or different polyolefin or other polyolefin compatible polymer, and containing approximately 2 to 5 times, preferably 2.5 to 4 times the final FR weight percentage is particularly useful. For example, a master batch containing about 30 weight percent magnesium hydroxide, 9 weight percent alumina trihydrate, and 9 weight percent zinc borate, balance polypropylene polymer, may be useful in forming bottom decks of multi-component pallets, as more fully described hereafter. A master batch may contain greater than 35 weight percent magnesium hydroxide, for example from 50 to 75 weight percent magnesium hydroxide. The master batch is then blended or "diluted" with additional polymer in an extruder prior to injection molding. By "extruder" is meant a screw-type device used to blend thermoplastics to form extrudates or to supply molten thermoplastic to an injection molding machine. The term should not be viewed as limiting, and other mixers may in principle be used.

By the term "polyolefin compatible" or simply "compatible" is meant a polymer which can be blended with polyolefin molding resin and molded into a polyolefin pallet or subassembly thereof while maintaining sufficient strength properties. The compatible polymer may phase separate to form small polymer particles or an interpenetrating polymer network, or may be miscible with the polyolefin. It is preferred that the compatible polymer be itself a polyolefin, particularly the same polyolefin or a polyolefin similar in composition to the polyolefin molding resin. For example, when polypropylene homopolymers or copolymers are used as the polyolefin molding resin, it is preferred that a polypropylene polymer be the polyolefin-compatible polymer of the flame retardant master batch.

As indicated previously, and as disclosed in copending and commonly assigned U.S. patent application Ser. No. 10/040,048, it has been found that valuable increases in flammability resistance of plastic pallets can be made without high loadings of flame retardants in each component of the pallet. For example, the top and bottom decks may have quite disparate loadings without substantially compromising performance. Thus, the total amount of flame retardants and thus the cost can be minimized. In addition, the blending of flame retardants is quicker and more efficient when employing lesser amounts of these ingredients.

Thus, for example, it has been found that the bottom deck of the pallet may contain from 10-15 weight percent magnesium hydroxide, preferably about 12 weight percent, and 2-5 weight percent of either or both alumina trihydrate and zinc borate, while the top deck may contain 20-30 of magnesium hydroxide, and substantially the same amounts of alumina trihydrate and zinc borate, or greater amounts of the latter two ingredients.

For relatively large amounts of flame retardants, i.e. for use in the top deck or other highly loaded parts, use of a master batch may not be suitable, or may be suitable to provide only a portion of the total loading, since the degree of dilution which is possible, e.g. for a bottom deck with only 12% magnesium hydroxide, is not feasible for a top deck with 25% magnesium hydroxide; the total amount of flame retardants in a master batch suitable for the latter application being intractable, or incapable of preparation. Thus, at least for the top deck, it is preferable to blend (compound) all or the most substantial portion, i.e. >50%, of the flame retardants directly into the polyolefin without using a master batch in such cases.

Having generally described this invention, a further understanding can be obtained by reference to certain specific examples which are provided herein for purposes of illustration only and are not intended to be limiting unless otherwise specified.

EXAMPLE 1 AND COMPARATIVE EXAMPLE C1

Pallets were manufactured by injection molding of subassemblies from polypropylene resin. The subassemblies were assembled into completed pallets and joined together by fusion bonding. The pallet of Example 1 included the FR package of the present invention, added to an extruder with polypropylene resin such that the final polymer of the Example 1 pallet contained 25% magnesium hydroxide, 4% alumina trihydrate, and 4% zinc borate. The comparative Example C1 contained no FR package.

Figure 2:
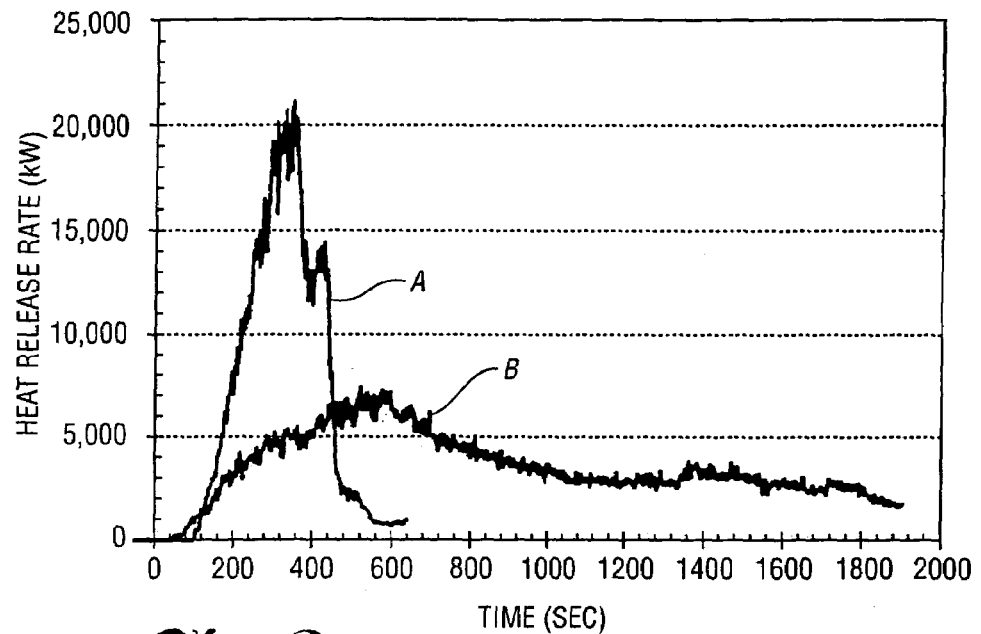
FIG. 2 illustrates the free burn heat release rates of six foot stacks of non-listed plastic pallets and wood pallets.

A six foot stack of wood pallets positioned under a 10 MW calorimeter, calibrated to 10,000 kW, was ignited, and the heat release monitored over time. A similar stack of commercial polypropylene pallets containing no or minimal flame retardants (Comparative Example C1) was similarly positioned and ignited. Conventional overhead sprinklers at a height of 10 feet were activated electromechanically when a sprinkler activation temperature of 286° F. (141° C.) has been reached. The results are shown in FIG. 2. The polypropylene pallet stack exhibited a very high peak release rate (Curve A) of about 20,000 kW, as compared to the 7000 kW peak release rate of wood pallets (Curve B). This high release rate of the polypropylene pallets in turn triggered additional sprinklers which rapidly lowered the heat release after about 7 minutes. The lower heat release rate of the wood pallets did not trigger additional sprinklers, and thus the heat release rate decreased more steadily. In buildings with sprinkler concentrations similar to those activated by the wood pallets, the polypropylene pallets would have continued to exhibit an exceptionally high release rate.

Figure 3:
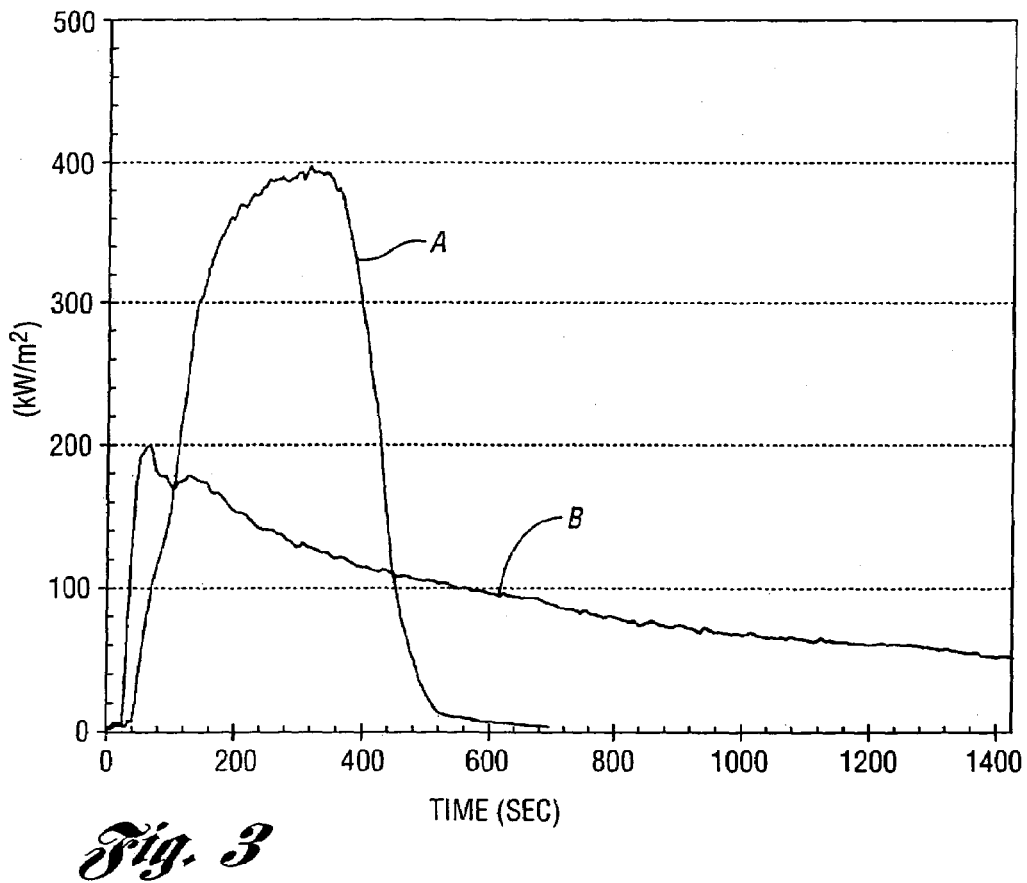
FIG. 3 compares heat release from burning non-listed polypropylene pallets and pallets of the present invention.

FIG. 3 compares the heat release rate of conventional polypropylene pallets (curve A) with flame retardant pallets of the subject invention (curve B) in a limited test. It is noted that the maximum heat release rate of the inventive flame retardant pallets is only half that of conventional polypropylene pallets, and at six minutes, is only about 40% of the heat release rate of conventional polypropylene. The behavior of the polypropylene pallets made flame retardant in accordance with the invention behave more similarly to wood pallets in their heat release rate, facilitating a similar flammability rating.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A flame retardant injection molded polyolefin pallet which meets the flammability requirements of U.L. 2335, comprising one or more subassemblies, at least one flame retardant subassembly containing a pulverulent flame retardant package consisting essentially of from 8 to 35 weight percent of magnesium hydroxide based on the weight of said flame retardant subassembly, wherein when reinforcing fibers are present they consist of glass fibers.

2. The pallet of claim 1, wherein said flame retardant subassembly comprises polypropylene.

3. The pallet of claim 1, which meets or exceeds the standards set forth for pallet flammability in UL 2335 "Fire Tests of Storage Pallets."

4. The pallet of claim 1, further comprising one or more of inorganic fillers, glass fiber reinforcement, and additional organic flame retardant.

5. The pallet of claim 1, wherein all subassemblies comprise flame retardant polypropylene.

6. The pallet of claim 1 which further comprises polypropylene and at least one additional polymer other than polypropylene.

7. The pallet of claim 6, wherein said at least one additional polymer is present within the polypropylene as particles or as in interpenetrating polymer network.

8. The pallet of claim 1, wherein said pallet contains a top deck containing 1 to 30% magnesium hydroxide by weight, and a bottom deck containing 10-15% magnesium hydroxide.

9. A flame retardant polyolefin pallet comprising one or more subassemblies, at least one flame retardant subassembly consisting essentially of polyolefin(s), magnesium hydroxide in an amount of 8-25% based on the total weight of the flame retardant subassembly, optionally one or more inorganic fillers, optionally a reinforcement consisting of glass fibers, optionally one or more polymers other than polyolefins, and optionally further flame retardants.

10. The pallet of claim 7, wherein said flame retardant subassembly essentially of polypropylene and magnesium hydroxide.

11. A process for the manufacture of a flame retardant polyolefin pallet of claim 1, comprising
   a) supplying a polyolefin molding resin containing 8-35 weight percent magnesium hydroxide,
   b) molding at least one subassembly of said flame retardant pallet from said polyolefin molding resin, and
   c) if said pallet contains a plurality of subassemblies, fixing said subassemblies together to form a pallet, wherein when reinforcing fibers are present they consist of glass fibers.

12. The process of claim 11 wherein said polyolefin molding resin is prepared by mixing a polyolefin with a master batch containing polyolefin and magnesium hydroxide, containing greater than 35 weight percent of magnesium hydroxide.

13. The process of claim 12, wherein said master batch contains 50 to 75 weight percent magnesium hydroxide.

14. The process of claim 11, wherein said magnesium hydroxide is in the form of particles having a mean particle size within the range of 1 to 200 μm.

15. The process of claim 11, wherein said magnesium hydroxide is in the form of particles having a mean particle size within the range of 1 to 20 μm.

* * * * *